United States Patent [19]
Wilson et al.

[11] 4,442,713
[45] Apr. 17, 1984

[54] FREQUENCY VARIED ULTRASONIC IMAGING ARRAY

[75] Inventors: David A. Wilson; James L. Buxton, both of Palo Alto, Calif.

[73] Assignee: SRI International, Menlo Park, Calif.

[21] Appl. No.: 356,498

[22] Filed: Mar. 9, 1982

[51] Int. Cl.³ .................................. G01N 29/00
[52] U.S. Cl. ............................ 73/599; 73/626; 128/660
[58] Field of Search .............. 73/599, 625, 626; 128/660

[56] References Cited

U.S. PATENT DOCUMENTS

| | | | |
|---|---|---|---|
| 3,815,409 | 6/1974 | Macovski | 73/625 |
| 3,824,531 | 7/1974 | Walsh | 340/105 |
| 4,016,750 | 4/1977 | Green | 73/629 |
| 4,235,111 | 11/1980 | Hassler | 73/626 |
| 4,276,779 | 7/1981 | Davis, Jr. | 73/626 |
| 4,290,310 | 9/1981 | Anderson | 73/626 |
| 4,307,613 | 12/1981 | Fox | 73/626 |
| 4,319,489 | 3/1982 | Yamaguchi et al. | 73/626 |
| 4,328,707 | 5/1982 | Clement et al. | 73/626 |
| 4,372,323 | 2/1983 | Takemura et al. | 73/625 |

Primary Examiner—Howard A. Birmiel
Attorney, Agent, or Firm—Edward B. Gregg; Willis E. Higgins; Urban H. Faubion

[57] ABSTRACT

An ultrasonic imaging apparatus has an array (10 or 100) of transducer elements (14 or 104) for transmitting ultrasonic signals into an object (12) to be analyzed through use of the transmitted signals reflected from the object and sensed by the apparatus. The transmitted signals have a first predetermined center frequency. The reflected signals sensed by the apparatus have a second center frequency less than the first center frequency as a result of signal attenuation by the object. A means (70, 62 or 150, 152-1 through 152-X) is connected to select a number of transducers (14 or 104) in the array (10 or 100) for transmitting and/or receiving the ultrasonic signals based on the second center frequency. Adjusting the number of transmitting and/or receiving transducers (14 or 104) with changes in frequency produced by signal attenuation gives improved image resolution under a wider variety of use conditions than with prior art ultrasonic imaging apparatus.

25 Claims, 5 Drawing Figures

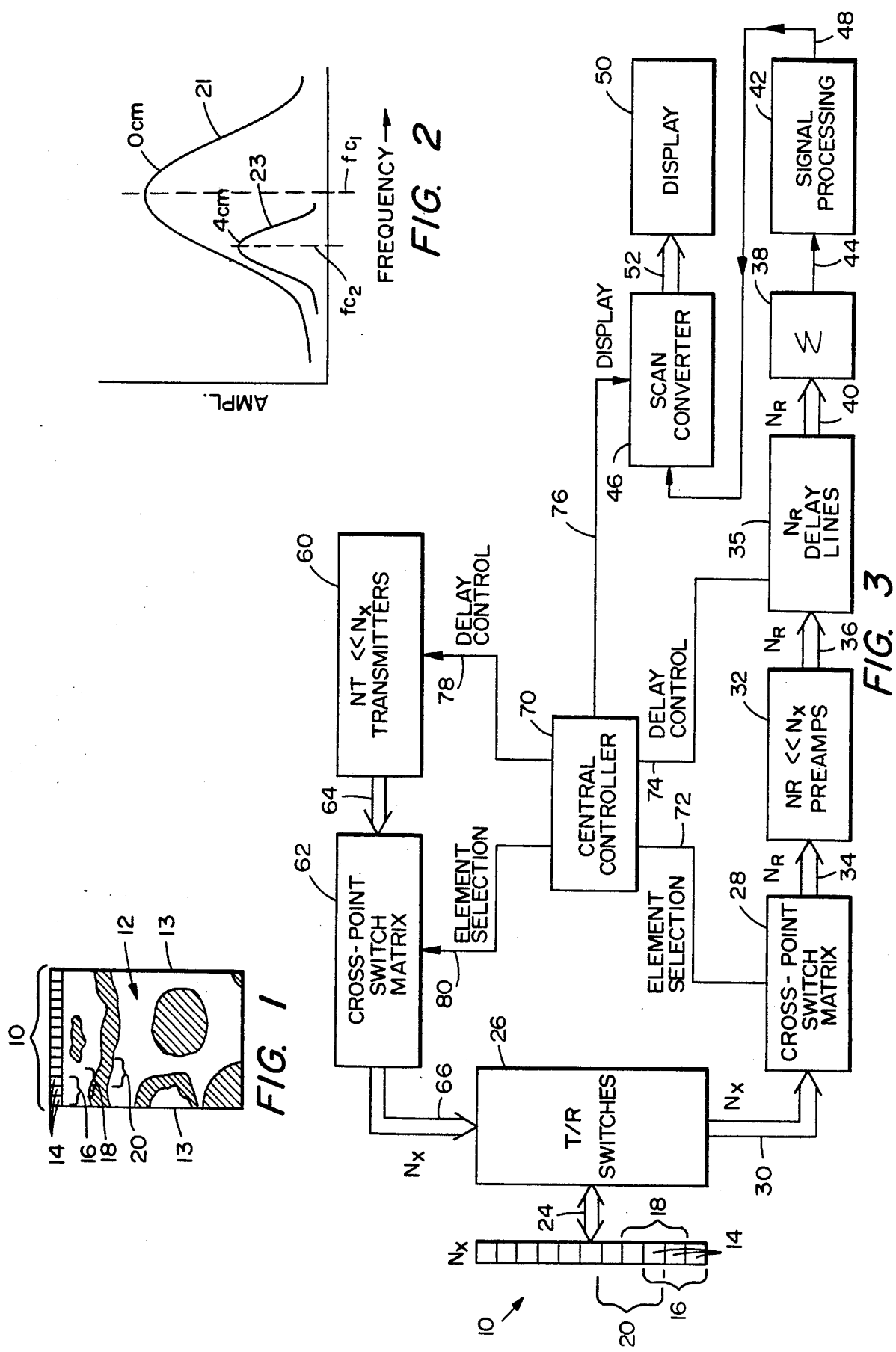

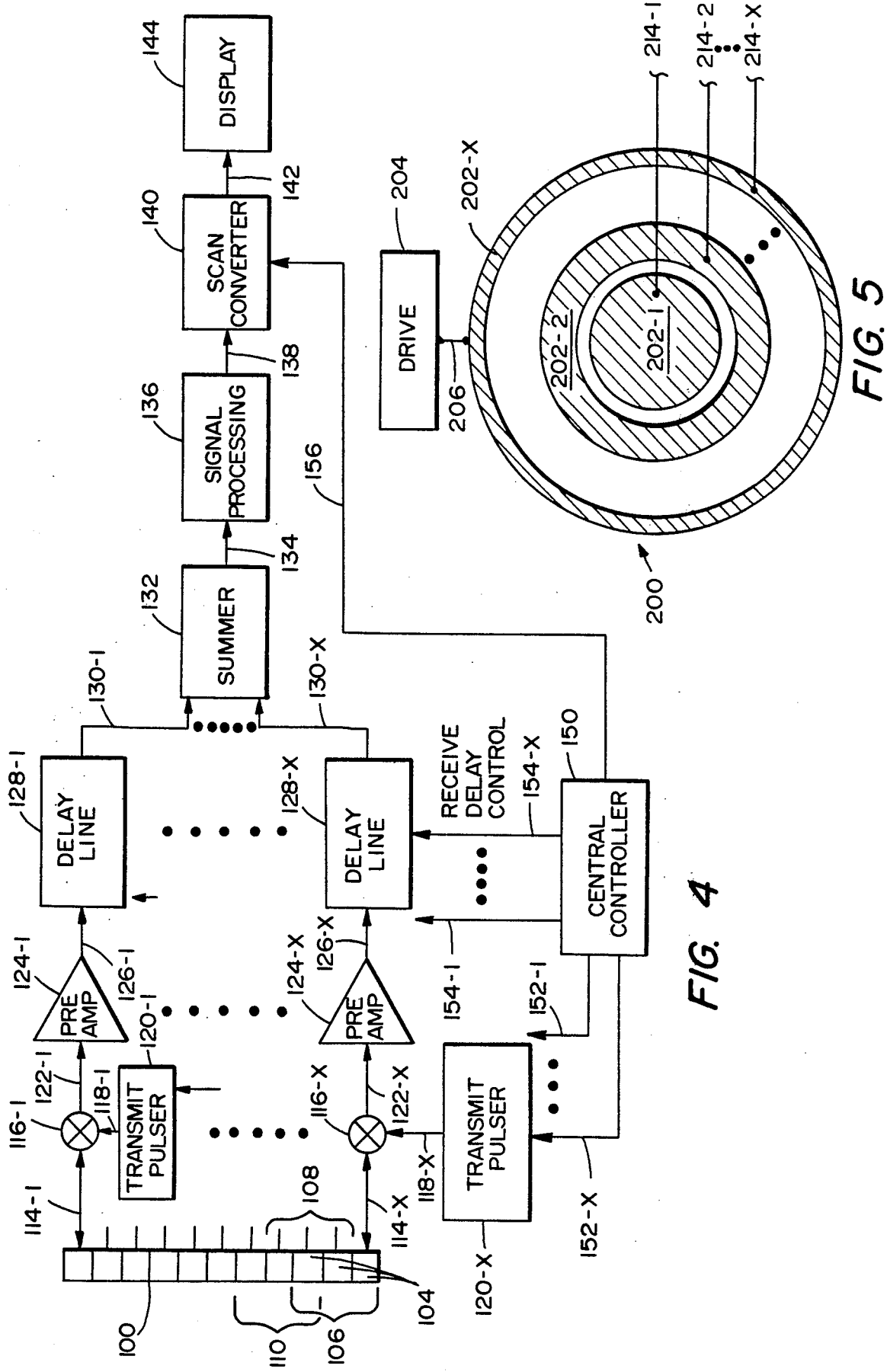

FREQUENCY VARIED ULTRASONIC IMAGING ARRAY

CROSS REFERENCE TO RELATED APPLICATION

This application and a concurrently filed application, entitled "Frequency Controlled Hybrid Ultrasonic Imaging Arrays", by David A. Wilson, James L. Buxton and Philip S. Green are directed to related inventions.

FIELD OF THE INVENTION

This application is directed to improvements in ultrasonic imaging apparatus to produce a better image quality. More particularly, the invention relates to improved modes of operation for ultrasonic transducers utilized in such imaging apparatus.

DESCRIPTION OF THE PRIOR ART

The use of ultrasonic sound waves in apparatus for the analysis of solid objects is now a well-known and comparatively well developed art. In such apparatus, an array of ultrasonic transducer elements is used to transmit ultrasonic waves into the object, and echoes of the waves are used to define geometry and related characteristics of the object's interior. Such ultrasonic imaging apparatus has been found to be particularly useful in medical applications as a non-invasive diagnostic tool. The state of the art in such medical applications has been reviewed, for example, by Havlice and Taenzer, "Medical Ultrasonic Imaging", Proceedings of the IEEE, Volume 67, No. 4, April 1979, pages 620 to 641.

As pointed out in the Havlice and Taenzer article, presently available electronically scanned medical ultrasonic imaging apparatus is of two principal types: linear stepped array and (linear) phased array. In the linear stepped array apparatus, each ultrasonic transducer element group in the array has a fixed beam direction, directly in front of the group element. Successive groups of transducer elements are activated to define a rectilinear field of vision. In the (linear) phased array, all of the ultrasonic transducer elements in the array are activated simultaneously, but different length-of-delay lines are used to direct the ultrasonic waves in a sector scan and sometimes to focus the ultrasonic waves to a particular depth in the sector field of vision.

Further, it is known in the art of such ultrasonic imaging apparatus to increase aperture size with increased focal length at a fixed frequency of operation, in order to increase image resolution, as taught in, for example, Thomas, U.S. Pat. No. 4,180,790 and Tiemann, U.S. Pat. No. 4,180,791. However, a need still remains to increase image resolution in such ultrasonic imaging apparatus, in order to allow more complete replacement of such invasive diagnostic methods as angiograms with non-invasive ultrasonic imaging, and to obtain more diagnostic information from ultrasonic techniques.

It is well recognized that attenuation of higher frequency ultrasonic signals occurs as the signals penetrate more deeply into tissue. This causes a net frequency shift downward away from the average transmission frequency and therefore results in image degradation.

One approach that has been employed to minimize the degradation in resolution with increasing focal depth associated with prior art systems has been to use electrical high pass filtering to remove excess low frequency information from signal echoes from within an object being analyzed, and thus force the center frequency of the sensed signals back up toward the transmission or design frequency. This is a poor solution deep in the image, because most of the signal energy is at the lower frequencies and high pass filtering therefore reduces the net signal considerably. The result is a significant degradation of signal-to-noise ratio.

SUMMARY OF THE INVENTION

Accordingly, it is an object of this invention to provide an ultrasonic imaging apparatus in which operating parameters of the apparatus are changed for lower frequencies resulting from attenuation by an object being analyzed of ultrasonic signals as sensed by the apparatus.

It is another object of the invention to provide an ultrasonic imaging apparatus in which a number of transducer elements used to define a transmission and receiving aperture is varied, depending on the center frequency of the sensed ultrasonic signals.

The attainment of these and related objects may be achieved through use of the novel ultrasonic imaging apparatus herein disclosed. Apparatus in accordance with this invention includes an array of transducer elements for transmitting ultrasonic signals having a first predetermined center frequency into an object to be examined through use of the transmitted signals reflected from the object. Within the object, the ultrasonic signals are reduced to a second center frequency, which is lower than the first center frequency as a result of attenuation by the object, as sensed by the apparatus after reflection by interfaces or discontinuities within the object at a given depth. There will be a different second center frequency for echoes from each depth in the object. A means is connected to select a number of transducers in the array for transmitting and/or receiving the ultrasonic signals based on the second center frequency. The number of such transducers for transmitting and/or receiving the ultrasonic signals is increased as the second center frequency decreases, which means that the number of transducers so selected will increase as an apparatus transmitting at a fixed first predetermined center frequency is focused more deeply away from the apparatus into the object being analyzed. The number of such transducers selected on the basis of the second center frequency of the ultrasonic signals as sensed by the apparatus will be different than the number of transducers which would be selected on the basis of focus depth alone, in accordance with the prior art. The second center frequency can itself be sensed by the apparatus and the number of transmitting transducers selected, or an assumed second center frequency as a function of depth of focus used to select the number of transmitting transducers. The number of receiving transducers may be selected in the same manner. In a preferred form of the invention, both the number of transmitting and receiving transducers will be selected in this manner, but the resulting number of each need not be the same. Note that the final center frequency used depends both on the frequency-dependent tissue attenuation, and on whatever electrical filtering is done in the transmit and receive circuitry.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a side view of a conventional linear stepped array, which may be utilized with the invention.

FIG. 2 is a graph of frequency spectra useful for understanding the invention.

FIG. 3 is a block diagram of an imaging apparatus including the array shown in FIG. 1.

FIG. 4 is a block diagram of another apparatus in accordance with the invention.

FIG. 5 is a block diagram of another apparatus in accordance with the invention.

DETAILED DESCRIPTION OF THE INVENTION

Turning now to the drawings, more particularly to FIG. 1, there is shown a linear stepped array 10, which may be utilized with the invention. The array 10 is positioned to image a portion 12 of a person's body. The portion 12 is rectilinear in shape because successive groups of transducer elements 14 in the array 10, a portion of the groups being respectively indicated by brackets 16, 18 and 20, are activated and stepped from left to right in the array 10 as shown to define a rectilinear field of vision 13 of the array 10.

It should be noted that each group 16, 18 and 20 of transducer elements 14 indicated in FIG. 1 is shown to contain three of the transducer elements 14. As will be explained in more detail below, the number of elements 14 in each group 16, 18 and 20 will be changed, depending on the center frequency of ultrasonic signals sensed at the transducer elements 14, due to attenuation by the body under investigation. In all cases the center frequency of the sensed ultrasonic signals will be less than the frequency of the ultrasonic signals as transmitted by the elements 14, due to the attenuation. The difference between the center frequency of the ultrasonic signals as sensed and the center frequency of the transmitted ultrasonic signals will depend on their depth of penetration into body 12 before reflection. Thus, as the transmitted ultrasonic signals are focused deeper into the body 12, a substantial decrease in the center frequency of the sensed ultrasonic signals occurs.

FIG. 2 shows an idealized representation of typical transmitted and received ultrasonic spectra 21 and 23 which may be obtained with transducer array 10. Since a proportionally greater attenuation of the transmitted spectrum 21 (0 cm into body 12) occurs at higher frequencies, its center frequency $f_{c1}$ is greater than the center frequency $f_{c2}$ of spectrum 23, which is reflected from 4 cm within body 12.

There are certain mathematical relationships defining the nature of the attenuation useful for a more complete understanding of the present invention. Transducers 14 in FIG. 1 produce ultrasonic signals which we will assume for simplicity have a Gaussian frequency response as received after reflection back at the transducers, which may be described by the following equation:

$$V(f) = A\, e^{-\alpha (f-f_0)^2} \qquad \text{Equation (1)}$$

Where
A = constant,
V(f) = round-trip voltage response,
$f_o$ = center frequency of received signal,
$\alpha = (\ln 4)/(\Delta f)^2$,
$\Delta f = -3$ dB full bandwidth.
No attenuation in tissue is assumed in Equation (1).

Equation 1 may be expressed in terms of a fractional bandwidth, B, which is equal to $\Delta f/f_0$, as follows:

$$V(f) = A\, e^{\left[\frac{-(\ln 4)(f-f_0)^2}{(B f_0)^2}\right]} \qquad \text{Equation (2)}$$

Attenuation of the signals produced by transmission through the body tissue 12 can be approximated by a loss term proportional to frequency in the following manner:

$$\text{Loss (dB)} = K \cdot f\,(\text{MHz}) \cdot 2 \cdot \text{depth (cm)}$$

where K varies from 0.6 dB/cm/MHz to 1.2 dB/cm/MHz in typical soft tissue. This amplitude loss can be written exponentially as shown in the following equation:

$$A(f,d) = e^{-0.23 \times K(\text{dB/cm/MHz}) \times f(\text{MHz}) \times \text{depth (cm)}} \qquad \text{Equation (3)}$$

One of the advantages of the present invention is that no electrical filtering of the transmitted or received signals is required. Assuming no such filtering is done, Equations 2 and 3 can be combined to get the round trip signal as a function of frequency and depth into the tissue. To find the sensed center frequency at each depth of focus, the resulting expression must be differentiated, e.g., $$\frac{d}{df}[V(f,d)] = 0. \text{ This yields} \qquad \text{Equation (4)}$$

$$f_{center} = f_0 - 0.083 \times K(\text{dB/cm/MHz}) \times \text{depth (cm)} \times B^2 \times f_0^2$$

In Equation (4), $f_{center}$ is never less than 0.

FIG. 3 is one embodiment of a block diagram of the electronics for operating the linear stepped array of FIG. 1 with increasing the number of elements 14 in each group 16, 18 or 20, based on the decrease in center frequency of the transmitted ultrasonic signals, as sensed by the apparatus after reflection by portion 12 (FIG. 1) of a person's body or another object being analyzed. Each of the elements 14 of array 10 is connected by means of a line in cable 24 to one of transmit/receive switches 26 for controlling whether elements 14 are operated in the transmit or receive mode. The transmit and receive switches are connected to a crosspoint switch matrix 28 by cable 30, with the number of lines in cable 30 also being equal to the number ($N_x$) of elements 14 in array 10. Crosspoint switch matrix 28 is connected to preamplifiers 32 by cable 34. The number ($N_r$) of receiving preamplifiers represented at 32 corresponds to the maximum number of elements 14 contained within groups 16, 18 and 20 of array 20. Since this number of elements $N_r$ increases with the decrease in center frequency of ultrasonic signals resulting from attenuation in the object being analyzed as sensed by the apparatus, $N_r$ is determined by the maximum extent of signal attenuation expected in use of the apparatus. Preamplifiers 32 are connected to delay lines 35 by cable 36. Again, the number of lines in cable 36 and the number of delay lines represented at 35 is equal to $N_r$. The delay lines 35 may be implemented as conventional digital delay lines. The delay lines 35 are connected to summing circuits 38 by cable 40, which again contains $N_r$ lines. Summing circuits 38 are connected to signal processing circuits 42 by line 44. The signal processing circuits 42 are in turn connected to scan converter circuits 46 by line 48. The scan converter circuits 46 are connected to display 50 by line 52. Display 50 is typically a video monitor.

Transmitters 60 are connected to crosspoint switch matrix 62 by cable 64. The number ($N_t$) of transmitters represented at 60 is determined by the number of elements 14 contained within groups 16, 18 and 20 of array 10 used for transmission of signals to the object being analyzed. While $N_t$ is increased in a similar manner as in the case of $N_r$ based on signal attenuation, $N_t$ and $N_r$ may either be the same number or different numbers. The crosspoint switch matrix 62 is used to select the elements 14 for transmission of the signals generated by transmitter 60. Crosspoint switch matrix 62 is connected to transmit and receive switches 26 by cable 66, with the same number of lines as the number ($N_x$) of elements 14 in array 10. In order to control the operation of certain of the functional blocks in the apparatus, a central controller 70 is respectively connected by control lines 72, 74, 76, 78 and 80 to crosspoint switch matrix 28, delay lines 35, scan converter 46, transmitters 60 and crosspoint switch matrix 62. Controller 70 can either be implemented in hard wired form for speed, or implemented with a commercially available microprocessor integrated circuit, such as an Intel 8086 or a Motorola 68000 type microprocessor. Control lines 72 and 80 provide element selection commands to the crosspoint switch matrices 28 and 62. Signal lines 74 and 78 provide delay control signals to delay lines 34 and transmitters 60 in order to provide focusing of the ultrasonic signals in the apparatus. Control line 76 provides appropriate signals for converting information signals to display signals.

In other respects than the selection of the number $N_t$ of transmitting transducers 14 and the number $N_r$ of receiving transducers 14 in groups 16, 18 and 20 of array 10 based on signal attenuation, the apparatus of FIG. 2 is operated in a conventional manner. The signal attenuation may either be actually measured and the numbers $N_t$ and $N_r$ controlled dynamically on that basis, or assumed signal attenuation may be designed in the device and the numbers $N_t$ and $N_r$ varied on the basis of the assumed attenuation correlated with depth of focus.

FIG. 4 is a somewhat more detailed block diagram of another ultrasonic imaging apparatus in accordance with the invention. Array 100 includes transducer elements 104 arranged in overlapping groups 106, 108 and 110 as in FIGS. 1 and 2. Each of the elements 104 of array 100 is connected by a line 114-1 to 114-X to a transmit and receive switch 116-1 through 116-x. Each transmit and receive switch 116-1 through 116-X is connected by a line 118-1 through 118-X to transmit pulser circuits 120-1 through 120-X. The transmit and receive switches 116-1 through 116-X are also connected by lines 122-1 through 122-X to preamplifiers 124-1 through 124-X. The preamplifiers 124-1 through 124-X are in turn connected by lines 126-1 through 126-X to digital delay lines 128-1 through 128-X. Digital delay lines 128-1 through 128-X are connected by lines 130-1 through 130-X to summing circuits 132. Summing circuits 132 are connected by line 134 to signal processing circuits 136. Signal processing circuits 136 are connected by line 138 to scan converter circuits 140, which are in turn connected by line 142 to a video display 144.

Central controller 150 is connected by lines 152-1 through 152-X to each of the transmit pulser circuits 120-1 through 120-X. Central controller 150 is connected to each digital delay line 128-1 through 128-X by control lines 154-1 through 154-X. Control signal lines 152-1 through 152-X supply transmit-delay control signals to the transmit pulser circuits 120-1 through 120-X. The control lines 154-1 through 154-X transmit receive-delay control signals to delay lines 128-1 through 128-X. Central controller 150 is also connected by control line 156 to scan converter 140. If controller 150 is implemented as a microprocessor, a suitable control program for implementing the control functions described herein is provided in a read only memory (ROM).

The apparatus shown in FIG. 4 differs from the apparatus of FIG. 3 in that the transmit pulser circuits 120-1 through 120-X, preamplifiers 124-1 through 124-X and delay lines 128-1 through 128-X are implemented in fully parallel form. This construction allows the system of FIG. 4 to be operated either in accordance with the present invention or in accordance with the above referenced Wilson et al "Frequency Controlled Hybrid Ultrasonic Imaging Arrays" related invention. In accordance with the present invention, at any given instant, some of the transducers 104 are operated as transmitters, and some are operated as receivers with the number of transducers 104 in each group 106, 108 and 110 being selected on the basis of sensed signal attenuation.

Both the FIG. 3 and 4 embodiments can be operated with a fixed transmit focus, a sweep receive focus, and dynamic focusing, or with zone transmit and receive focus and dual dynamic focusing.

In operation of a system as shown in FIGS. 3 and 4, assuming a transmitted frequency of 10 MHz, the ultrasonic signal would be attenuated approximately as shown below in Table I, based on the mathematical relationship discussed above.

TABLE I

| Bandwidth (%) | Attenuation factor (dB/cm/MHz) | $f_{center}$ at 2 cm (MHz) | $f_{center}$ at 4 cm (MHz) |
|---|---|---|---|
| 40 | 0.8 | 7.9 | 5.8 |
| 40 | 1.0 | 7.3 | 4.7 |
| 40 | 1.2 | 6.8 | 3.6 |
| 50 | 0.8 | 6.7 | 3.4 |
| 50 | 1.0 | 5.9 | 1.7 |
| 50 | 1.2 | 5.0 | 0.04 |

Consider the case of a 40% bandwidth (typical of a good imaging transducer) with a tissue attenuation of 1.0 dB/cm/MHz. In this case one should optimize the array performance for a 7.3 MHz center frequency at 2 cm deep, and a 4.7 MHz center frequency at 4 cm deep.

As the frequency drops, the beam width of each element increases approximately as 1/frequency, and thus the number of elements which can be effectively used also increases by approximately this factor. The number of elements which could be used is shown below in Table II.

TABLE II

| | (Number of elements used) | |
|---|---|---|
| Depth | Old Design* | New Design |
| 2 cm | 9 | 12 |
| 4 cm | 15 | 32 |

*Increase in elements proportional to focus depth

For a complete system design this type of analysis is done at each depth for a continuously focused system, or in each local zone for a zone focused system.

FIG. 5 shows a portion of another embodiment of the invention in which an annular array 200 is used to transmit and receive the ultrasonic signals used to define an image of an object being examined with the apparatus. The annular array 200 includes elements 202-1 through 202-X, each respectively connected to lines 214-1 through 214-X. A mechanical scan mechanism 204 is connected to the annular array 200, as indicated at 206, which scans the array 200 in a conventional manner to define an image. The remainder of a system incorporating the annular array 200 is as shown in FIG. 4.

In operation, the number of elements 202-1 through 202-X of array 200 selected to transmit and/or receive the ultrasonic signals used to define the image of the object being examined is varied, depending on frequency attenuation of the transmitted ultrasonic signal within the object, either as measured or as assumed in the design of the system. As in the case of a linear array, the number of elements 202-1 through 202-X utilized increases with increasing depth within the object being examined.

The following listing is a program for calculating the center frequency of an ultrasonic spectrum at a given depth in tissue and can be used in the selection of a number of transmitting and/or sensing transducer elements in accordance with the invention. The program runs on a Digital Equipment PDP 11/40 minicomputer.

```
5       ! PEAK
10      ! TISSUE ATTEN EFFECT ON CENTER FREQ
30      INPUT "ATTEN (DB/CM/MHZ)",A
40      ? "":? ""
50      ? "D","FR","RMAX"
100     FOR D=0 TO 4 STEP .5
103     RM=0
105     FOR FR=.25 TO 15 STEP .25
110     A1=0.493*(FR−9.75)*(FR−9.75)
120     A2=.23*A*FR*D
130     R=EXP(−A1−A2)
140     IF R>RM THEN RM=R:FM=FR
150     NEXT FR
155     ? ""
160     ? D,FM,RM
170     NEXT D
```

The listing below is a program for a Hewlett-Packard HP-85 desk calculator which calculates and plots ultrasonic spectra at various depths in tissue, and is of further assistance in the selection of a number of transmitting and/or sensing transducers in accordance with the invention.

```
100     GOSUB 1000 ! INIT
110     GOSUB 2000 ! INPUT
120     GOSUB 4000 ! PLOT SET-UP
130     GOSUB 3000 ! CALCULATE&PLOT
140     GOSUB 5000 ! COPY
160     GOTO 110
1000    ! INIT
1010    F0=10 ! MHz XDUCER CENTER FREQ
1020    F1=0 ! MIN FREQ
1030    F2=15 ! MAX FREQ
1040    F3=.25 ! ΔF
1050    B1=40 ! %BANDWIDTH
1060    B=B1*.01 ! FRAC BANDWIDTH
1070    K=.6 ! dB/cm/MHz
1080    Z1=6 ! DEPTH INTO TISSUE(cm)
1090    Z2=1 ! ΔZ FOR PLOTTING
1100    CLEAR
1110    DISP "DATE" @ INPUT D9$
1999    RETURN
2000    ! INPUT
2005    CLEAR
2010    DISP "F=";F0;"MHz XDUCER FREQ"
2020    DISP "B=";B1;"BANDWIDTH"
2030    DISP "K=";K;"dB/cm/MHz"
2040    DISP "ZMAX=";Z1;"cm DEEP"
2050    DISP @ DISP
2060    DISP "TYPE,VALUE"; @ INPUT T$,V
2070    IF T$="F" THEN F0=V
2080    IF T$="B" THEN B1=V @ B=.01*B1
2090    IF T$="K" THEN K=V
2100    IF T$="Z" THEN Z1=V
2110    IF T$="0" THEN RETURN
2120    GOTO 2005
2999    RETURN
3000    ! CALCULATE
3005    FOR Z=0 TO Z1 STEP Z2
3007    PENUP
3008    Q=0
3010    FOR F=F1 TO F2 STEP F3
3020    A=−K*F*2*Z
3030    T=−12*((F−F0)/(B*F0)) 2
3040    L=A+T
3050    IF L>Y1 THEN PLOT F,L @ Q=1
3055    IF L<Y1 AND Q>0 THEN LABEL VAL$(Z) @ PENUP @ Q=2
3060    NEXT F
3065    IF Q#2 THEN IMOVE .25,0 @ LABEL VAL$(Z)
3070    PENUP
3080    NEXT Z
3999    RETURN
4000    ! PLOT SET-UP
4010    CLEAR
4020    GCLEAR
4040    Y1=−80 ! YMIN
4050    Y2=0 ! YMAX
4060    SCALE F1−1,F2+1,Y1−10, Y2+10
4070    XAXIS Y1,1,F1,F2
4080    XAXIS Y2,1,F1,F2
4085    XAXIS −40,1,F1,F2
4090    YAXIS F1,10,Y1,Y2
4100    YAXIS F2,10,Y1,Y2
4110    YAXIS 5,10,Y1,Y2
4115    YAXIS 10,10,Y1,Y2
4120    FOR F=F1 TO F2 STEP 5
4130    MOVE .95*F,Y1−10 @ LABEL VAL$(F)
4140    NEXT F
4990    PENUP
4999    RETURN
5000    ! COPY
5005    PRINT "DATE IS ";D9$ @ PRINT
5010    PRINT "XDUCER FREQ=";F0;"MHz"
5020    PRINT "BANDWIDTH=";B1;"%"
5030    PRINT K;"dB/cm/MHZ"
5040    PRINT "DEPTHS FROM 0 TO";Z1;"cm"
5050    PRINT @ PRINT
5060    GRAPH @ COPY
5070    PRINT @ PRINT @ PRINT @ PRINT @ PRINT
5999    RETURN
```

It should now be apparent to those skilled in the art that ultrasonic imaging apparatus of achieving the stated objects of the invention has been provided. With respect to the stepped array embodiments of FIGS. 3 and 4, improved image resolution is obtained by increasing aperture size on the basis of decreases in center frequency due to signal attenuation. In the prior art approach to array design for such systems, the number of elements defining aperture size is increased only proportional to the depth of focus. Resolution is assumed to be held constant at each depth because the center frequency is assumed to be independent of depth. However, since the center frequency actually is reduced in the image, image resolution is actually degraded deep in the image of prior art systems.

In contrast, enlarging the aperture by increasing the number of transducer elements used in each group to be stepped inversely proportional to signal degradation allows one to retain high image resolution at deep field focus. Filtering of the signal is not necessary, and the signal-to-noise ratio need not be degraded. This same principle is equally applicable to lower frequency linear arrays, such as those designed at 3.5 MHz transmission frequency for abdominal scanning. The principle may also be applied to annular array design by using a larger group of annular transducer elements deep in the image selected on the basis of reduction in center frequency from signal attenuation.

It should further be apparent to those skilled in the art that various changes in form and details of the invention as shown and described may be made. It is intended that such modifications be included within the spirit and scope of the claims appended hereto.

We claim:

1. An ultrasonic imaging apparatus, which comprises an array of transducer elements for transmitting ultrasonic signals having a first predetermined center frequency into an object to be examined through use of the transmitted signals reflected from within the object and sensed by the apparatus, the reflected signals sensed by the apparatus having a second center frequency less than the first center frequency as a result of signal attenuation by the object, and means connected to select a number of transducers in said array for transmitting the ultrasonic signals inversely proportional to the second center frequency.

2. The ultrasonic imaging apparatus of claim 1 in which said transducer element array comprises a linear stepped array.

3. The ultrasonic imaging apparatus of claim 1 in which said transducer element array comprises an annular array.

4. The ultrasonic imaging apparatus of claim 1 in which said transducer element array also receives the transmitted signals reflected from the object.

5. The ultrasonic imaging apparatus of claim 4 additionally comprising a means connected to select a number of transducers in said transducer element array for sensing the reflected signals inversely proportional to the second center frequency.

6. The ultrasonic imaging apparatus of claim 5 further comprising means for determining the second center frequency, said frequency determining means being connected to control said transmitting transducer selecting means and said receiving transducer selecting means.

7. The ultrasonic imaging apparatus of claim 1 further comprising means for determining the second center frequency, said frequency determining means being connected to control said transmitting transducer selecting means.

8. The ultrasonic imaging apparatus of claim 1 in which said second center frequency is calculated, based on a depth within the object being examined.

9. An ultrasonic imaging apparatus, which comprises an array of transducer elements for transmitting ultrasonic signals having a first predetermined center frequency into an object to be examined through use of the transmitted signals reflected from within the object and sensed by said transducer element array, the reflected signals having a second center frequency less than the first center frequency as a result of signal attenuation by the object, and means connected to select a number of transducers in said transducer element array for sensing the reflected signals inversely proportional to the second center frequency.

10. The ultrasonic imaging apparatus of claim 9 further comprising means for determining the second center frequency, said frequency determining means being connected to control said receiving transducer selecting means.

11. The ultrasonic imaging apparatus of claim 9 in which said second center frequency is calculated, based on a depth within the object being analyzed.

12. An ultrasonic imaging apparatus, which comprises an array of transducer elements for transmitting ultrasonic signals having a first predetermined frequency spectrum into an object to be examined through use of the transmitted signals reflected from within the object and sensed by the apparatus having a second frequency spectrum different than the first frequency spectrum as a result of signal attenuation by the object, and means connected to select a number of transducers in said transducer element array for transmitting the ultrasonic signals inversely proportional to a change in the second frequency spectrum.

13. The ultrasonic imaging apparatus of claim 12 in which said transducer element array comprises a linear stepped array.

14. The ultrasonic imaging apparatus of claim 13 additionally comprising means connected to select a number of transducers in said transducer element array for sensing the reflected signals inversely proportional to a change in the second frequency spectrum.

15. The ultrasonic imaging apparatus of claim 14 further comprising means for determining at least one parameter of the second frequency spectrum, said spectrum determining means being connected to control said transmitting transducer selecting means and said receiving transducer selecting means.

16. The ultrasonic imaging apparatus of claim 13 further comprising means for determining at least one parameter of the second frequency spectrum, said spectrum determining means being connected to control said transmitting transducer selecting means.

17. The ultrasonic imaging apparatus of claim 13 in which at least one parameter of the second center frequency is calculated based on a depth within the object being examined.

18. The ultrasonic imaging apparatus of claim 13 in which said transducer element array comprises an annular array.

19. The ultrasonic imaging apparatus of claim 18 additionally comprising means connected to select a number of transducers in said transducer element array for sensing the reflected signals inversely proportional to a change in the second frequency spectrum.

20. The ultrasonic imaging apparatus of claim 19 further comprising means for determining at least one parameter of the second frequency spectrum, said spectrum determining means being connected to control said transmitting transducer selecting means and said receiving transducer selecting means.

21. The ultrasonic imaging apparatus of claim 18 further comprising means for determining at least one parameter of the second frequency spectrum, said spectrum determining means being connected to control said transmitting transducer selecting means.

22. The ultrasonic imaging apparatus of claim 18 in which at least one parameter of the second center frequency is calculated based on a depth within the object being examined.

23. An ultrasonic imaging apparatus, which comprises an array of transducer elements for transmitting ultrasonic signals having a first predetermined frequency spectrum into an object to be examined from within the object and sensed by said transducer element array, the reflected signals having a second frequency spectrum different than the first frequency spectrum as a result of signal attenuation by the object, and means connected to select a number of transducers in said transducer element array for sensing the reflected signals inversely proportional to a change in the second frequency spectrum.

24. The ultrasonic imaging apparatus of claim 23 further comprising means for determining at least one parameter of the second frequency spectrum, said spectrum determining means being connected to control said receiving transducer selecting means.

25. The ultrasonic imaging apparatus of claim 23 in which at least one parameter of the second center frequency is calculated based on a depth within the object being examined.

* * * * *